(12) United States Patent
John et al.

(10) Patent No.: US 11,685,528 B2
(45) Date of Patent: Jun. 27, 2023

(54) SOLENOID VALVE WITH NON-SLIDING PLUNGER ASSEMBLY

(71) Applicant: B/E AEROSPACE, INC., Winston Salem, NC (US)

(72) Inventors: Poly Puthur John, Trivandrum (IN); Mahammadrafi Bagawan, Bangalore (IN)

(73) Assignee: B/E Aerospace, Inc., Winston Salem, NC (US)

( * ) Notice: Subject to any disclaimer, the term of this patent is extended or adjusted under 35 U.S.C. 154(b) by 0 days.

(21) Appl. No.: 17/061,001

(22) Filed: Oct. 1, 2020

(65) Prior Publication Data

US 2021/0331801 A1 Oct. 28, 2021

(30) Foreign Application Priority Data

Apr. 24, 2020 (IN) .............................. 202041017672

(51) Int. Cl.
*F16K 31/06* (2006.01)
*B64D 11/02* (2006.01)

(52) U.S. Cl.
CPC .......... *B64D 11/02* (2013.01); *F16K 31/0624* (2013.01); *F16K 31/0627* (2013.01); *F16K 31/0655* (2013.01); *F16K 31/0651* (2013.01)

(58) Field of Classification Search
CPC ............. F16K 31/0627; F16K 31/0624; F16K 31/0655; F16K 31/0651; F16F 1/377;
(Continued)

(56) References Cited

U.S. PATENT DOCUMENTS 2,407,757 A * 9/1946 MacCallum .......... F16D 27/112
192/89.25
2,632,791 A * 3/1953 Side ....................... G01R 19/18
335/251

(Continued)

FOREIGN PATENT DOCUMENTS

CN 102116389 7/2011
DE 2303450 A1 * 1/1973 ............. F16K 31/06
(Continued)

OTHER PUBLICATIONS

European Patent Office, European Search Report dated Sep. 20, 2021 in Application No. 21170446.5.

*Primary Examiner* — Umashankar Venkatesan
(74) *Attorney, Agent, or Firm* — Snell & Wilmer L.L.P.

(57) ABSTRACT

A solenoid valve including a non-sliding plunger assembly. The solenoid valve disclosed herein generally includes a plunger assembly that is moveably suspended within an internal chamber of a housing of the solenoid valve away from any sliding contact with adjacent surfaces. The plunger assembly may not be in sliding contact with any of the adjacent surfaces, and thus a radial gap may be defined between the plunger assembly and all non-moving, non-flexing features and surfaces of the solenoid valve. The solenoid valve may include a flexural washer that is resiliently flexible and is configured to enable selective axial movement of the plunger assembly in response to energizing the solenoid coil. In various embodiments, the flexural washer is configured to moveably suspend the plunger assembly within the internal chamber away from any sliding contact with adjacent surfaces.

13 Claims, 4 Drawing Sheets

(58) Field of Classification Search
CPC ........ F16F 2234/08; F16F 1/027; F16F 1/025; F16F 1/10; F16F 1/02
See application file for complete search history.

(56) References Cited

U.S. PATENT DOCUMENTS

| | | | | |
|---|---|---|---|---|
| 2,690,529 | A * | 9/1954 | Lindblad | H01F 7/1638 335/228 |
| 4,196,751 | A * | 4/1980 | Fischer | F16K 31/0627 137/625.65 |
| 4,299,252 | A * | 11/1981 | Reinicke | F16K 31/0606 335/229 |
| 5,374,029 | A * | 12/1994 | Bailey | F16K 31/0606 137/613 |
| 6,220,569 | B1 * | 4/2001 | Kelly | F16K 31/06 251/129.08 |
| 6,351,199 | B1 | 2/2002 | Perini | |
| 7,748,683 | B1 * | 7/2010 | Kelly | F16K 31/0655 251/129.08 |
| 10,088,068 | B2 | 10/2018 | Marocchini et al. | |
| 2014/0008557 | A1 * | 1/2014 | Vandamme | F16K 31/0658 267/158 |
| 2018/0284818 | A1 | 10/2018 | Christenson | |

FOREIGN PATENT DOCUMENTS

| | | | | |
|---|---|---|---|---|
| DE | 2245255 | | 4/1974 | |
| DE | 2739085 | A1 * | 3/1979 | ............. F16K 31/06 |
| WO | 2015082573 | | 6/2015 | |

* cited by examiner

SOLENOID VALVE WITH NON-SLIDING PLUNGER ASSEMBLY

FIELD

This application claims priority to and the benefit of Indian Provisional Patent Application No. 202041017672 filed on Apr. 24, 2020 entitled "SOLENOID VALVE WITH NON-SLIDING PLUNGER ASSEMBLY."

FIELD

The present disclosure relates to solenoid valves, and in particular to non-sliding plunger assemblies of solenoid valves.

BACKGROUND

Solenoid valves are electromechanical valves that are utilized in many different applications. Generally, the operation of a solenoid valve involves electrically energizing a solenoid coil to generate a magnetic field, and this generated magnetic field induces movement of a magnetic plunger to actuate the valve. Solenoid valves may be implemented to control water flow on an aircraft, such as for a faucet system in an aircraft lavatory. For example, by varying the duty cycles for solenoid valves in hot water and cold water supply lines, the temperature of the combined water stream can be controlled. However, the repeated and pulsing actuation of conventional solenoid valves (e.g., in faucet systems for aircraft) results in mechanical wear at the close sliding interfaces between the moveable plunger and the adjacent housing. The excessive mechanical wear at the sliding interfaces may produce liberated metallic particles which can negatively affect the seal-seat interface and thereby result in internal valve leakage, among other adverse effects.

SUMMARY

In various embodiments, the present disclosure provides a solenoid valve comprising a housing and plunger assembly. The housing defines an internal chamber and the plunger assembly is moveably suspended within the internal chamber away from any sliding contact with adjacent surfaces, according to various embodiments. The plunger assembly may include a valve seal configured to selectively engage a corresponding valve seat.

In various embodiments, the plunger assembly is not in sliding contact with any of the adjacent surfaces. In various embodiments, a radial gap is defined between the plunger assembly and all non-moving, non-flexing features and surfaces of the solenoid valve. In various embodiments, the solenoid valve includes a flexural washer disposed within the internal chamber, with the flexural washer being configured to moveably suspend the plunger assembly within the internal chamber.

In various embodiments, the flexural washer prevents radial movement of plunger assembly and enables selective axial movement in response to energizing a solenoid coil of the solenoid valve. In various embodiments, the flexural washer comprises a radially outward portion and a radially inward portion. The radially outward portion may be mounted to the housing and the radially inward portion may be coupled to the plunger assembly. In various embodiments, the flexural washer comprises a radially intermediate portion disposed radially between the radially outward portion and the radially inward portion. At least the radially intermediate portion of the flexural washer is configured to resiliently flex to enable selective axial movement of the plunger assembly in response to energizing a solenoid coil of the solenoid valve, according to various embodiments.

In various embodiments, the radially outward portion of the flexural washer is a radially outward ring, the radially intermediate portion of the flexural washer includes a radially intermediate ring, and the radially inward portion of the flexural washer is a radially inward ring. The radially outward ring may be connected to the radially intermediate ring via a first radially extending web segment and the radially inward ring may be connected to the radially intermediate ring via a second radially extending web segment. In various embodiments, a first radial cutout is defined between the radially outward ring and the radially intermediate ring, with the first radially extending web segment spanning the first radial cutout. In various embodiments, a second radial cutout is defined between the radially inward ring and the radially intermediate ring, with the second radially extending web segment spanning the second radial cutout.

In various embodiments, the first radially extending web segment comprises a first pair of radially extending web segments that are opposing each other along a first diameter. In various embodiments, the second radially extending web segment comprises a second pair of radially extending web segments that are opposing each other along a second diameter. In various embodiments, the first diameter is offset 90 degrees from the second diameter.

In various embodiments, the flexural washer is a first flexural washer coupled to a first axial end portion of the plunger assembly. In various embodiments, the solenoid valve further comprises a second flexural washer coupled to a second axial end portion of the plunger assembly. The flexural washer may be a first flexural washer, the solenoid valve may further include a second flexural washer extending proximate to the first flexural washer, and the first flexural washer and the second flexural washer may form a flexural washer cartridge. The flexural washer cartridge may include an axial spacer disposed between the first flexural washer and the second flexural washer. In various embodiments, the plunger assembly comprises a magnetic body portion, a non-magnetic plunger rod portion, and a valve poppet comprising the valve seat.

Also disclosed herein, according to various embodiments, is a solenoid valve that includes a housing, a flexural washer, a plunger assembly, and a solenoid coil. The housing generally defines an internal chamber, according to various embodiments. The flexural washer may be disposed within the internal chamber of the housing and may include a radially outward portion and a radially inward portion, with the radially outward portion being mounted to the housing. In various embodiments, the plunger assembly is disposed within the internal chamber of the housing and comprises a valve seal configured to selectively engage a corresponding valve seat, wherein the plunger assembly is coupled to the radially inward portion of the flexural washer so as to be suspended within the internal chamber. The solenoid coil may be disposed radially outward of the plunger assembly.

In various embodiments, the flexural washer is resiliently flexible and is thus configured to enable selective axial movement of the plunger assembly in response to energizing the solenoid coil. In various embodiments, the flexural washer is configured to moveably suspend the plunger assembly within the internal chamber away from any sliding contact with adjacent surfaces. In various embodiments, the plunger assembly is not in sliding contact with any of the adjacent surfaces. In various embodiments, a radial gap is defined between the plunger assembly and all non-moving, non-flexing features and surfaces of the solenoid valve. Also disclosed herein, according to various embodiments, is a faucet system of an aircraft lavatory, the faucet system including a manifold that includes one or more of the aforementioned solenoid valves.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Disclosed herein, according to various embodiments, is a solenoid valve having a non-sliding plunger assembly. That is, the solenoid valve disclosed herein generally includes a plunger assembly that is moveably suspended within an internal chamber of a housing of the solenoid valve away from any sliding contact with adjacent surfaces. Although details and examples are included herein pertaining to implementing the solenoid valve in a faucet system/manifold for an aircraft lavatory, the present disclosure is not necessarily so limited, and thus aspects of the disclosed embodiments may be adapted for performance in a variety of other industries. As such, numerous applications of the present disclosure may be realized.

Figure 1:
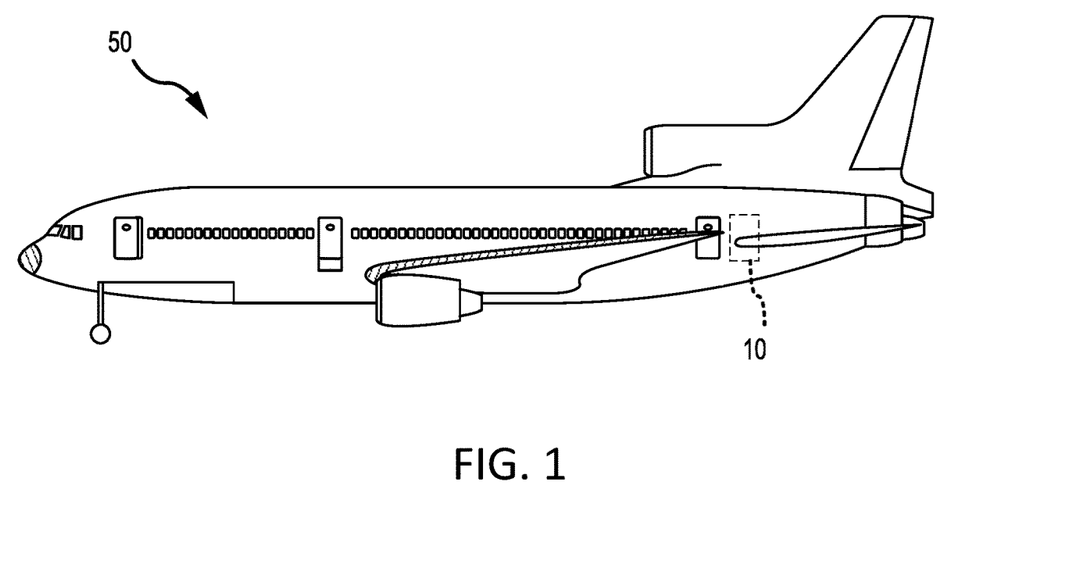
FIG. 1 illustrates an aircraft having a lavatory, in accordance with various embodiments.
Figure 2:
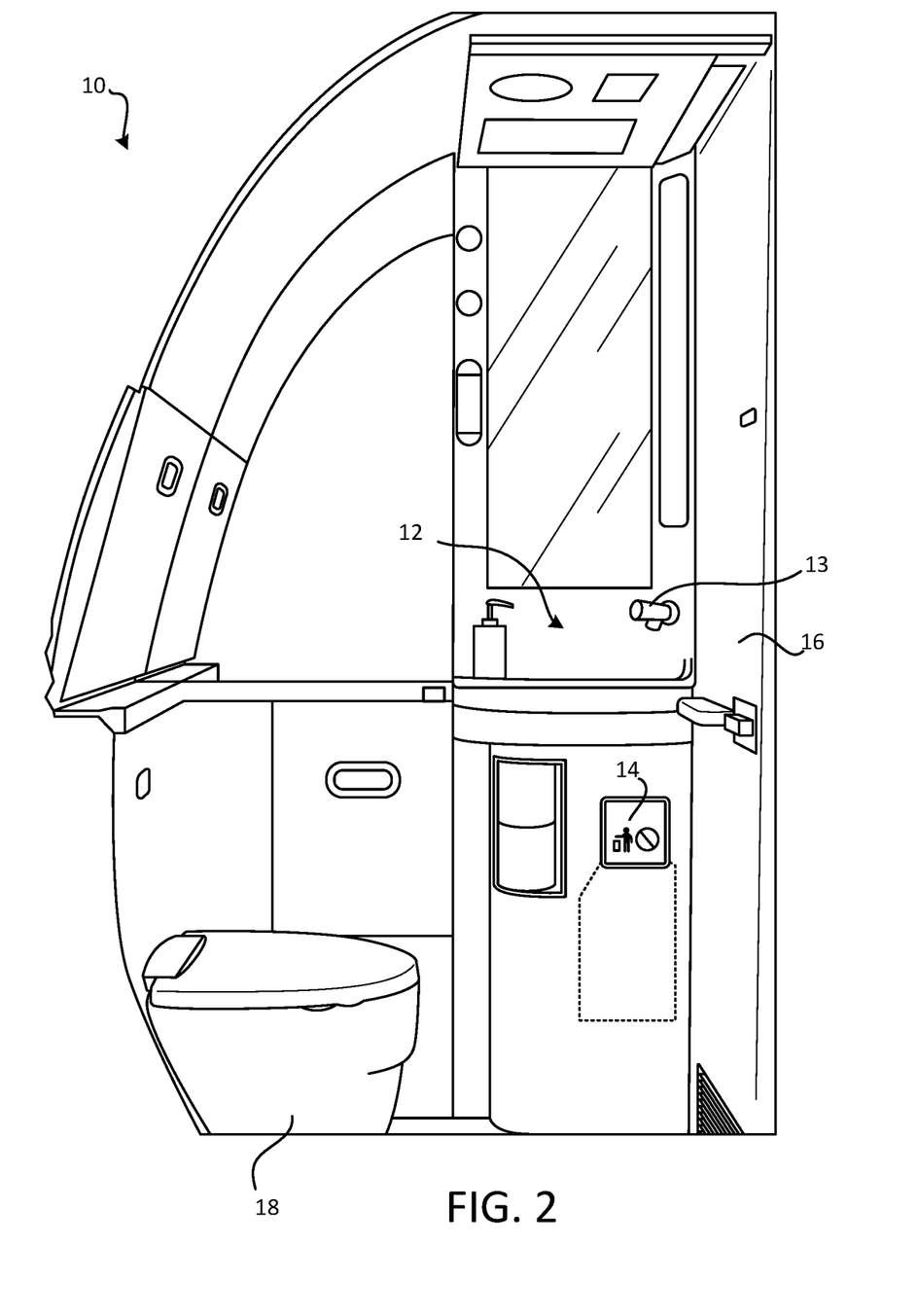
FIG. 2 illustrates a perspective view of an aircraft lavatory, in accordance with various embodiments.

In various embodiments, and with reference to FIGS. 1 and 2, an aircraft 50 may include aircraft lavatory 10. The aircraft lavatory 10 may include a washbasin (e.g., a sink) 12 with a faucet system 13, a trash receptacle 14, a door 16, and a toilet 18, among other features. The faucet system 13 may include a faucet manifold that includes one or more solenoid valves in hot and/or cold water lines. The solenoid valves may be pulse actuated to control the mixture of hot and cold water, thereby controlling the temperature of the combined water stream. Due to the repeated on/off operating cycles of solenoid valves in such faucet systems (e.g., 5-8 million cycles), the solenoid valve may include a plunger assembly that is moveably suspended within an internal chamber of the solenoid valve away from any sliding contact with adjacent surfaces. Thus, the non-sliding solenoid valve disclosed herein and described in greater detail below may have various operational, lifetime, and seal integrity benefits over conventional sliding solenoid valves, according to various embodiments.

Figure 3A:
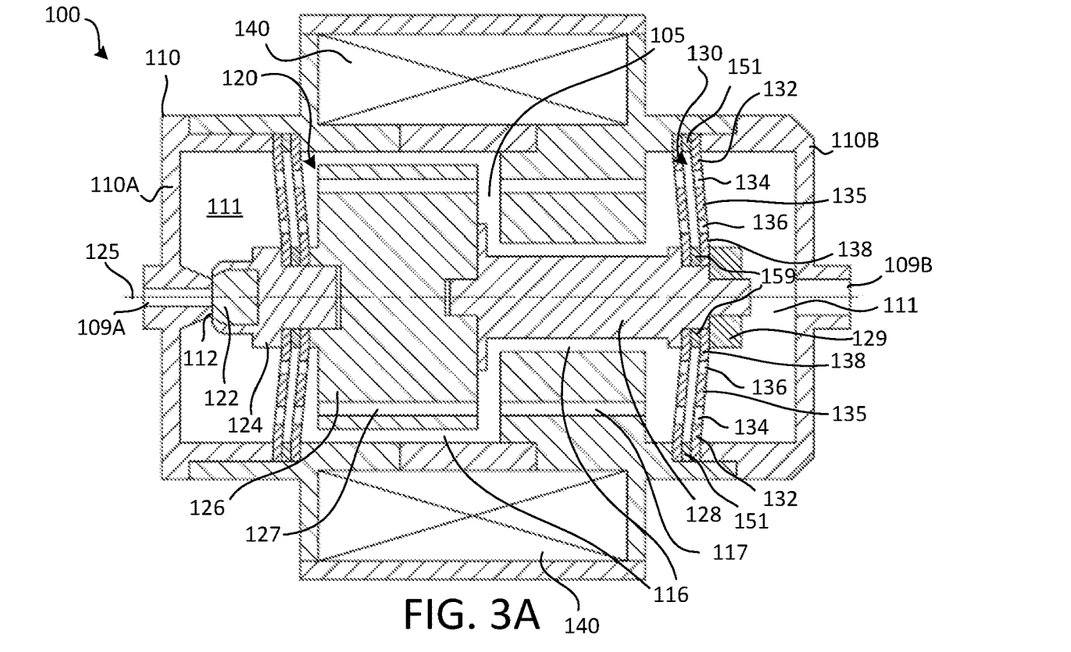
FIG. 3A is a cross-sectional view of a solenoid valve in a closed position having a non-sliding plunger assembly, in accordance with various embodiments.
Figure 3B:
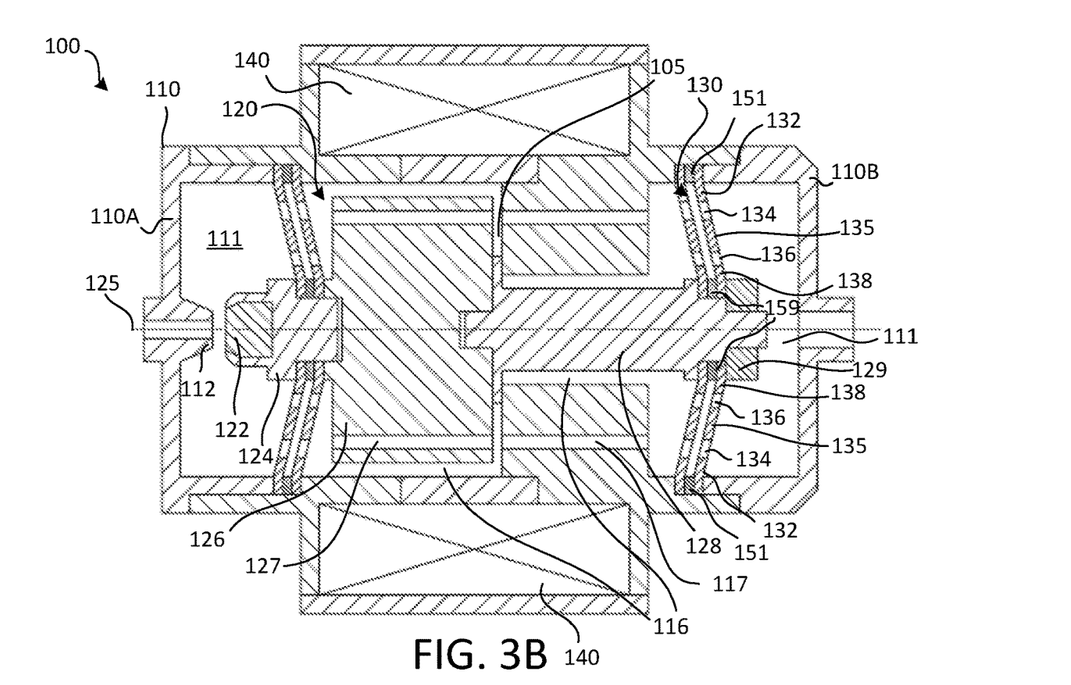
FIG. 3B is a cross-sectional view of a solenoid valve in an open position having a non-sliding plunger assembly, in accordance with various embodiments.

In various embodiments, and with reference to FIGS. 3A and 3B, a solenoid valve 100 may be actuatable between a closed position (FIG. 3A) and an open position (FIG. 3B). The solenoid valve 100 generally includes a housing 110 defining an internal chamber 111 and a plunger assembly 120, according to various embodiments. The plunger assembly 120 includes a valve seal 122 configured to selectively engage a corresponding valve seat 112, and the plunger assembly 120 is moveably suspended within the internal chamber 111 away from any sliding contact with adjacent surfaces, according to various embodiments. That is, the plunger assembly 120 may not be in sliding contact with any of the adjacent surfaces. For example, a radial gap 116 may be defined between the plunger assembly 120 and all non-moving, non-flexing features and surfaces of the solenoid valve 100. In various embodiments, the solenoid valve 100 includes one or more flexural washers 130 that are configured to moveably suspend the plunger assembly 120 within the internal chamber 111, as described in greater detail below.

In various embodiments, the housing 110 may comprise an inlet fitting 110B, an outlet fitting 110A, the valve bonnet structure, supporting structure for the solenoid coil(s) 140, and/or any other non-moving structure that generally contribute to defining the fluid flow cavity (i.e., the internal chamber 111) within the solenoid valve 100. In various embodiments, and with continued reference to FIGS. 3A and 3B, the plunger assembly 120 may be the moveable portion of the solenoid valve 100. The plunger assembly 120 may include, in addition to the aforementioned valve seal 122 that operably interfaces with and engages a corresponding valve seat 112 of the housing 110, a valve poppet 124, a plunger body 126, and a plunger rod 128.

In response to energizing the solenoid coils 140, the generated magnetic field may magnetically induce movement of the plunger assembly 120. In various embodiments, at least one portion of the plunger assembly 120 is magnetic. For example, the plunger body 126 may be magnetic, with the valve poppet 124, and the plunger rod 128 being made from non-magnetic materials. The plunger assembly 120 may include a longitudinal axis 125, and the plunger assembly 120 may move along this longitudinal axis 125 (also referred to herein as a linear translation axis or a movement axis) during operation/actuation of the valve. FIG. 3A shows the solenoid valve 100 in the closed position with the plunger assembly 120 positioned so that the valve seal 122 is in sealing engagement with the valve seat 112. FIG. 3B shows the solenoid valve 100 in the open position with the plunger assembly 120 positioned so that the valve seal 122 is removed a distance from the valve seat 112 to allow flow through the channel of the valve seat 112. As seen in FIGS. 3A and 3B, the working gap 105 of the solenoid valve 100 is reduced as the plunger assembly 120 moves to change the valve from the closed position (FIG. 3A) to the open position (FIG. 3B), according to various embodiments. Said differently, with the valve in the open position (FIG. 3B), fluid may be allowed to flow through an inlet 109B defined in the inlet fitting 110B of the housing 110, around and/or through the plunger assembly 120 (via radial gap 116 and/or optional flow channels 117, 127), through the gap defined between the valve seal 122 and the valve seat 112, and exit through the outlet 109A defined in the outlet fitting 110A of the housing 110.

In various embodiments, retaining and/or suspending the moveable plunger assembly 120 away from sliding contact with adjacent surfaces, features, or components includes utilizing the aforementioned flexural washer 130. That is, the solenoid valve 100 may include one or more flexural washers 130 that prevent radial movement of the plunger assembly 120 while enabling selective axial movement in response to the generated magnetic field from energized solenoid coils 140. For example, the flexural washer 130 may include a radially outward portion 132 mounted to the housing 110 and a radially inward portion 138 coupled to the plunger assembly 120. As used herein, the term "axial" refers to movement or directions along the longitudinal axis 125 and the terms "radial" and "radially" are relative to the longitudinal axis 125. Accordingly, features that are referred to as being "radially outward" are comparatively farther away from the longitudinal axis 125 than others, and correspondingly features that are referred to as being "radially inward" are comparatively closer to the longitudinal axis 125 than others.

In various embodiments, the flexural washer 130 is made from a resiliently flexible material, or at least a portion of the flexural washer 130 is made from a resiliently flexible material. The flexural washer 130 is configured to flex and/or bend in the axial direction. In various embodiments, the movement of the plunger assembly 120 and thus the flexure dynamics of the flexural washer 130 may be tailored for a specific application by changing the material used for the flexural washer 130, the thickness of the various sections/segments of the flexural washer 130 (as described in greater detail below), and/or the number of flexural washers 130 utilized. In various embodiments, the flexural washer is made from a high strength material. The material may be corrosion resistant, and/or the material of the flexural washer may be non-brittle. In various embodiments, the material of the flexural washer is stainless steel (e.g., 17-7PH) or nickel-based metal alloys, such as nickel, chromium, iron alloys. The flexural washers each may have an axial thickness between about 0.10 mm and about 1.0 mm. In various embodiments, each of the flexural washers has an axial thickness between about 0.15 mm and about 0.50 mm. In various embodiments, each of the flexural washers has an axial thickness between about 0.15 mm and about 0.40 mm. As used in this context only, the term "about" means plus or minus 5% of the indicated value. The flexural washer may be manufactured using non-contact machining processes, such as electro-discharge machining, thereby facilitating maximum fatigue life.

In various embodiments, the solenoid valve may include a single flexural washer. In various embodiments, the solenoid valve may include multiple flexural washers disposed at different locations along the length of the plunger assembly. In various embodiments, and with reference to FIGS. 3A and 3B, the solenoid valve 100 includes multiple flexural washers in proximity to each other, thus forming a "flexural washer cartridge" (to avoid obscuring the clarity of FIGS. 3A and 3B, only one of the flexural washer 130 is labeled in these figures, but in close proximity to the labeled flexural washer 130 is a second flexural washer that cumulatively forms a "flexural washer cartridge"). Axial spacers may be disposed between adjacent flexural washers of a flexural washer cartridge, such as radially outward axial spacer 151 and radially inward axial spacer 159. In various embodiments, each flexural washer cartridge may include two or more flexural washers. In various embodiments, the solenoid valve 100 may include two flexural washer cartridges, one disposed and coupled to a first axial end portion of the plunger assembly 120 and a second disposed and coupled to a second axial end portion of the plunger assembly 120.

Figure 4:
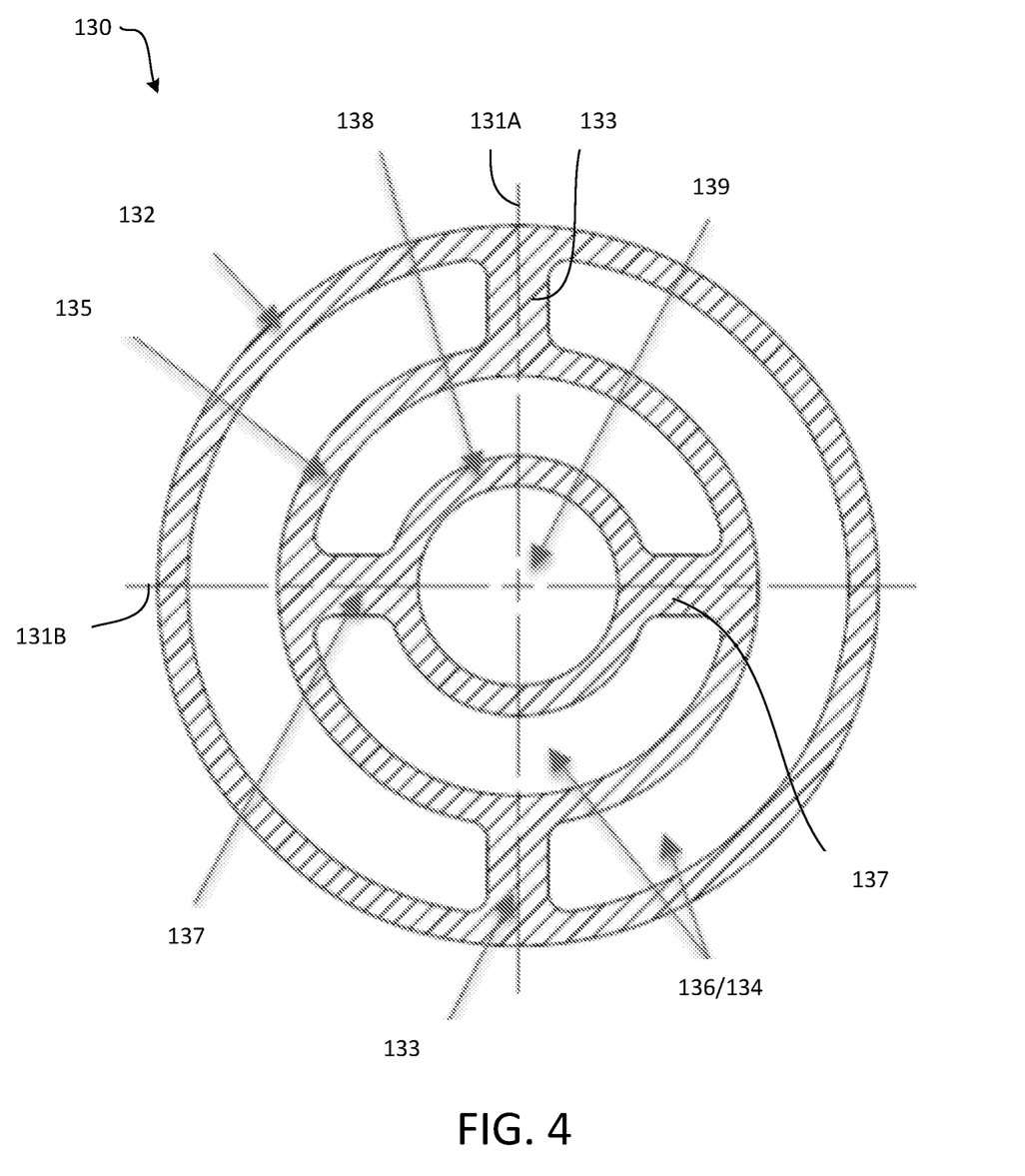
FIG. 4 is a cross-sectional view of a flexural washer of a solenoid valve, in accordance with various embodiments.

In various embodiments, and with reference to FIGS. 3A, 3B and 4, the flexural washer 130 includes a radially outward portion 132 mounted to the housing 110 and a radially inward portion 138 coupled to the plunger assembly 120. The flexural washer 130 may also include a radially intermediate portion 135 disposed radially between the radially outward portion 132 and the radially inward portion 138. The radially intermediate portion 135 may be the portion/section of the flexural washer 130 that is configured to resiliently flex to enable the selective axial movement of the plunger assembly 120 along the longitudinal axis 125 in response to energizing the solenoid coil 140. That is, the radially outward and inward portions 132, 138 may be made from a material that does not flex/bend to the same extend as the radially intermediate portion 135, or the radially outward and inward portions 132, 138 may be clamped or otherwise affixed to the associated components that these portions do not substantially flex/bend.

In various embodiments, the radially outward portion 132 is a radially outward ring, the radially inward portion 138 is a radially inward ring, and the radially intermediate portion 135 includes a radially intermediate ring (FIG. 3B). The radially intermediate portion 135 may also include radially extending web segments 133, 137 that interconnect the radially inward and outward portions/rings 132, 138 to the radially intermediate portion/ring 135. For example, the flexural washer 130 may include a first radially extending web segment 133 that extends radially between the radially outward portion 132 and the radially intermediate ring. Correspondingly, the flexural washer 130 may also include a second radially extending web segment 137 that extends radially between the radially inward portion 138 and the radially intermediate ring. In various embodiments, these radially extending web segments 133, 137 are the sections of the flexural washer 130 that are configured to substantially flex/bend. In various embodiments, these web segments 133, 137 are configured to enable the majority of the flex/bend that the flexural washer 130 experiences.

In various embodiments, the first radially extending web segment 133 comprises a first pair of radially extending web segments 133 that are opposing each other along a first diameter 131A (e.g., distributed 180 degrees apart) and the second radially extending web segment 137 comprises a second pair of radially extending web segments 137 that are opposing each other along a second diameter 131B (e.g., distributed 180 degrees apart). In various embodiments, the first diameter 131A is orthogonal to the second diameter 131B, and is thus offset 90 degrees from the second diameter 131B. In various embodiments, the flexural washer may include more than two radially extending web segments extending between the associated rings, and these radially extending web segments may be circumferentially distributed around the rings.

In various embodiments, a first radial cutout 134 is defined between the radially outward ring 132 and the radially intermediate ring 135, with the first radially extending web segment 133 spanning the first radial cutout 134. Similarly, and according to various embodiments a second radial cutout 136 is defined between the radially inward ring 138 and the radially intermediate ring 135, with the second radially extending web segment 137 spanning the second radial cutout 136. The fluid being controlled by the solenoid valve 100 may flow through these cutouts 134, 136.

In various embodiments, and with renewed reference to FIGS. 3A and 3B, the solenoid valve 100 may include a plunger assembly nut 129 coupled to the plunger assembly 120, with the plunger assembly nut 129 configured to engage the radially inward portion 138 of the flexural washer 130 to facilitate retention of the flexural washer 130 with the plunger assembly 120. In various embodiments, a first flexural washer (or a first flexural washer cartridge) is secured to the the plunger assembly 120 by being clamped/retained between a shoulder of the poppet valve 124 and the plunger body 126 and a second flexural washer (or second flexural washer cartridge) is secured to the plunger assembly 120 by being clamped/retained between a shoulder of the plunger rod 128 and the nut 129.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A solenoid valve comprising:
a housing defining an internal chamber; and
a plunger assembly comprising a valve seal configured to selectively engage a corresponding valve seat, wherein the plunger assembly is moveably suspended within the internal chamber away from any sliding contact with adjacent surfaces by a first flexural washer cartridge disposed within the internal chamber and coupled to a first axial end portion of the plunger assembly and a second flexural washer cartridge disposed within the internal chamber and coupled to a second axial end portion of the plunger assembly, wherein the first flexural washer cartridge and the second flexural washer cartridge each comprise:
a first flexural washer;
a second flexural washer, wherein the first flexural washer and the second flexural washer each comprise:
a radially outward portion mounted to the housing;
a radially inward portion coupled to the plunger assembly;
a radially intermediate portion disposed radially between the radially outward portion and the radially inward portion;
a first radially extending web segment that extends radially between the radially outward portion and the radially intermediate portion, the first radially extending web segment comprising a first pair of radially extending web segments that are distributed about 180 degrees apart along a first diameter;
a second radially extending web segment that extends radially between the radially inward portion and the radially intermediate portion, the second radially extending web segment comprising a second pair of radially extending web segments that are distributed about 180 degrees apart along a second diameter, wherein the first diameter is orthogonal to the second diameter;
a first radial cutout defined between the radially outward ring and the radially intermediate ring along the first diameter, with the first radially extending web segment spanning the first radial cutout; and
a second radial cutout defined between the radially inward ring and the radially intermediate ring along the second diameter, with the second radially extending web segment spanning the second radial cutout,
a radially outward axial spacer disposed between the first flexural washer and the second flexural washer, and
a radially inward axial spacer disposed between the first flexural washer and the second flexural washer,
wherein the radially inward axial spacer is coupled to the plunger assembly,
wherein the radially outward axial spacer is mounted to the housing, and
wherein the first flexural washer and the second flexural washer prevent radial movement of the plunger assembly and enables selective axial movement in response to energizing a solenoid coil of the solenoid valve.

2. The solenoid valve of claim 1, wherein a radial gap is defined between the plunger assembly and all non-moving, non-flexing features and surfaces of the solenoid valve.

3. The solenoid valve of claim 1, wherein:
the radially intermediate portion of the first flexural washer and the second flexural washer is configured to resiliently flex to enable selective axial movement of the plunger assembly in response to energizing a solenoid coil of the solenoid valve.

4. The solenoid valve of claim 3, wherein:
the radially outward portion of the flexural washer is a radially outward ring;
the radially intermediate portion of the flexural washer includes a radially intermediate ring;
the radially inward portion of the flexural washer is a radially inward ring;
the radially outward ring is connected to the radially intermediate ring via the first radially extending web segment; and
the radially inward ring is connected to the radially intermediate ring via the second radially extending web segment.

5. The solenoid valve of claim 4, wherein:
the fluid being controlled by the solenoid valve is configured to flow through the first radial cutout and the second radial cutout.

6. The solenoid valve of claim 1, wherein the first web segment is offset 90 degrees from the second web segment.

7. The solenoid valve of claim 1, wherein the plunger assembly comprises a magnetic body portion, a non-magnetic plunger rod portion, and a valve poppet comprising the valve seal.

8. A solenoid valve comprising:
a housing defining an internal chamber;
a plunger assembly disposed within the internal chamber of the housing and comprising a valve seal configured to selectively engage a corresponding valve seat;
a solenoid coil disposed radially outward of the plunger assembly;
a first flexural washer cartridge disposed within the internal chamber and coupled to a first axial end portion of the plunger assembly; and
a second flexural washer cartridge disposed within the internal chamber and coupled to a second axial end portion of the plunger assembly, wherein the first flexural washer cartridge and the second flexural washer cartridge each comprise:
a first flexural washer,
a second flexural washer, wherein the first flexural washer and the second flexural washer each comprise a radially outward portion mounted to the housing, a radially inward portion coupled to the plunger assembly so the plunger assembly is suspended within the internal chamber, a first radially extending web segment that extends radially between the radially outward portion and the radially intermediate portion, the first radially extending web segment comprising a first pair of radially extending web segments that are distributed about 180 degrees apart along a first diameter, a second radially extending web segment that extends radially between the radially inward portion and the radially intermediate portion, the second radially extending web segment comprising a second pair of radially extending web segments that are distributed about 180 degrees apart along a second diameter, wherein the first diameter is orthogonal to the second diameter, a first radial cutout defined between the radially outward ring and the radially intermediate ring along the first diameter, with the first radially extending web segment spanning the first radial cutout, and a second radial cutout defined between the radially inward ring and the radially intermediate ring along the second diameter, with the second radially extending web segment spanning the second radial cutout,
a radially outward axial spacer disposed between the first flexural washer and the second flexural washer, wherein the radially outward axial spacer is mounted to the housing, and
a radially inward axial spacer disposed between the first flexural washer and the second flexural washer, wherein the radially inward axial space is coupled to the plunger assembly.

9. The solenoid valve of claim 8, wherein the flexural washer is resiliently flexible and is thus configured to enable selective axial movement of the plunger assembly in response to energizing the solenoid coil.

10. The solenoid valve of claim 9, wherein the flexural washer is configured to moveably suspend the plunger assembly within the internal chamber away from any sliding contact with adjacent surfaces.

11. The solenoid valve of claim 9, wherein the plunger assembly is not in sliding contact with any of the adjacent surfaces.

12. The solenoid valve of claim 9, wherein a radial gap is defined between the plunger assembly and all non-moving, non-flexing features and surfaces of the solenoid valve.

13. A faucet system for an aircraft lavatory, the faucet system comprising a solenoid valve comprising:

a housing defining an internal chamber;
a plunger assembly disposed within the internal chamber of the housing and comprising a valve seal configured to selectively engage a corresponding valve seat;
a solenoid coil disposed radially outward of the plunger assembly;
a first flexural washer cartridge disposed within the internal chamber and coupled to a first axial end portion of the plunger assembly; and
a second flexural washer cartridge disposed within the internal chamber and coupled to a second axial end portion of the plunger assembly, wherein the first flexural washer cartridge and the second flexural washer cartridge each comprise:
a first flexural washer,
a second flexural washer, wherein the first flexural washer and the second flexural washer each comprise a radially outward portion mounted to the housing, a radially inward portion coupled to the plunger assembly so the plunger assembly is suspended within the internal chamber, a first radially extending web segment that extends radially between the radially outward portion and the radially intermediate portion, the first radially extending web segment comprising a first pair of radially extending web segments that are distributed 180 degrees apart along a first diameter, a second radially extending web segment that extends radially between the radially inward portion and the radially intermediate portion, the second radially extending web segment comprising a second pair of radially extending web segments that are distributed 180 degrees apart along a second diameter, wherein the first diameter is orthogonal to the second diameter, a first radial cutout defined between the radially outward ring and the radially intermediate ring along the first diameter, with the first radially extending web segment spanning the first radial cutout, and a second radial cutout defined between the radially inward ring and the radially intermediate ring along the second diameter, with the second radially extending web segment spanning the second radial cutout,
a radially outward axial spacer disposed between the first flexural washer and the second flexural washer, wherein the radially outward axial spacer is mounted to the housing, and
a radially inward axial spacer disposed between the first flexural washer and the second flexural washer, wherein the radially inward axial spacer is coupled to the plunger assembly.

* * * * *